April 8, 1958 F. W. SCHWARZ 2,830,278

DIP SOLDER LUG OR CLIP FOR PANEL MOUNTING

Filed June 24, 1953 2 Sheets-Sheet 1

INVENTOR:-
FRIEDRICH W. SCHWARZ
BY:-
Spencer, Johnston, Cook & Root
ATTORNEYS

DIP SOLDER LUG OR CLIP FOR PANEL MOUNTING

Filed June 24, 1953 2 Sheets-Sheet 2

INVENTOR:-
FRIEDRICH W. SCHWARZ
BY:-
Spencer, Johnston, Cook & Root
ATTORNEYS

United States Patent Office 2,830,278

Patented Apr. 8, 1958

2,830,278

DIP SOLDER LUG OR CLIP FOR PANEL MOUNTING

Friedrich W. Schwarz, Skokie, Ill., assignor, by mesne assignments, to Hoffman Electronics Corporation, Los Angeles, Calif., a corporation of California Application June 24, 1953, Serial No. 363,904

1 Claim. (Cl. 339—17)

The present invention relates in general to electrical circuits and has more particular reference to the formation of soldered electrical circuit connections, the invention pertaining more especially to improved means for producing soldered electrical connections in electrical circuits merely by dipping circuit forming parts briefly in a pool of molten solder and then withdrawing the parts from said pool.

An important object of the present invention is to provide a dip solder lug or clip adapted to receive an electrical conductor or conductors, whereby the conductor and lug may be electrically interconnected by means of a soldered joint formed by dipping portions of the lug and of the conductor therein beneath the surface of a pool of molten solder.

Another important object resides in providing a dip solder lug of the character mentioned comprising a hollow member formed of sheet metal and providing a channel for the reception of a conductor or conductors to be electrically connected with the lug by means of a dip soldered joint; a further object being to form the lug with integral resilient clip blades in position to detachably engage and secure a conductor element or elements in position to be dip soldered in the lug.

Another object of the invention is to provide a dip soldering lug comprising a piece of sheet metal formed to provide a tubular element adapted to receive electrical conductors inserted therein from one end, including resilient clip means formed on the tubular element to pressingly engage and secure such conductors therein adjacent the other end of the element in position to be dip soldered thereto at said other end; a further object being to form said tubular dip soldering lug with means thereon for attaching the same at one end on a mounting member, such as a panel, in position presenting the other end of the lug in position spaced outwardly of the panel for dip soldering immersion in a pool of molten solder.

Another important object is to provide a dip soldering lug comprising a tubular member having a mounting end formed with means for attaching the member on a support, such as a mounting panel, in position presenting the other end thereof in spaced relation outwardly of the panel, in position for immersion in a pool of solder, and resilient presser blade means formed on said member to yieldingly hold conductor elements within said tubular member in position to be dip soldered thereto, at said other end thereof; a further object being to employ a tubular member of rectangular sectional configuration and to form said blades on one side thereof in position yieldingly pressing upon the opposite side wall of the tubular member.

Another important object is to provide a tubular sheet metal dip soldering lug having integral outwardly extending mounting flange portions formed at an end of the tubular lug for engagement with support means, such as a mounting panel, to aid in anchoring the lug thereon; a further object being to form the tubular body of the soldering lug with an integral outstanding peripheral rib spaced inwardly of an end thereof, whereby said end may be assembled in a panel opening with the rib engaging one side of the panel at said opening, the soldering lug being secured on the panel by bending its mounting flange portions downwardly upon and into engagement with the other side of the panel.

Another important object is to provide a combined soldering lug and prong receiving contact element of the sort adapted for assembly in a socket receptacle for pronged elements such as electron flow tubes, whereby to provide for the production of socket receptacles having dip soldering facilities; a further object being to provide a soldering lug and prong receiving contact element electrically and mechanically connected in spaced relation for assembly as a unit in correspondingly spaced openings in a mounting panel; a further object being to secure said lug and contact in mounted position on the support panel by means of a cover plate anchored on the panel in position overlying at least said contact element and a portion of the means interconnecting the said element with the soldering lug; a still further object being to form the cover plate with a prong receiving opening therethrough in alinement with the contact element.

Another important object resides in providing an improved socket receptacle for receiving and supporting pronged units, such as electron flow tubes, said receptacle comprising a pair of plates including a support plate formed with a plurality of contact element openings in spaced relationship corresponding with the prongs of the unit to be accommodated, and solder lug openings spaced outwardly of said contact element openings, a terminal connection element assembled in each pair of contact element and terminal lug openings and comprising a sleeve-like soldering lug and a prong contact portion electrically and mechanically secured together in spaced relation and disposed respectively in said soldering lug and contact element openings, said socket assembly including a cover plate secured upon the support plate in position overlying the several connection terminal elements of the assembly, said cover plate having openings formed therein in alinement with each of the several soldering lug and prong contact portions of said terminal elements.

Another important object is to provide a circuit wiring device comprising a panel of insulating material having a multiplicity of soldering lugs mounted in spaced apart relation, preferably in alined rows and columns on said panel, whereby to facilitate the interconnection of any desired electrical circuit elements in any desired circuit system; a further object being to mount on said panel a plurality of terminal elements comprising soldering lug and connected prong contact portions, whereby to provide one or more prong socket receptacles on said panel.

The foregoing and numerous other objects, advantages and inherent functions of the invention will become apparent as the same is more fully understood from the following description, which, taken in conjunction with the accompanying drawings, discloses a preferred embodiment of the invention.

Referring to the drawings:

Fig. 1 shows a support panel fitted with dip soldering devices embodying the present invention;

Figs. 2 and 3 are sectional views respectively taken substantially along the lines 2—2 and 3—3 in Fig. 1;

Figures 9, 10, 11, 12:
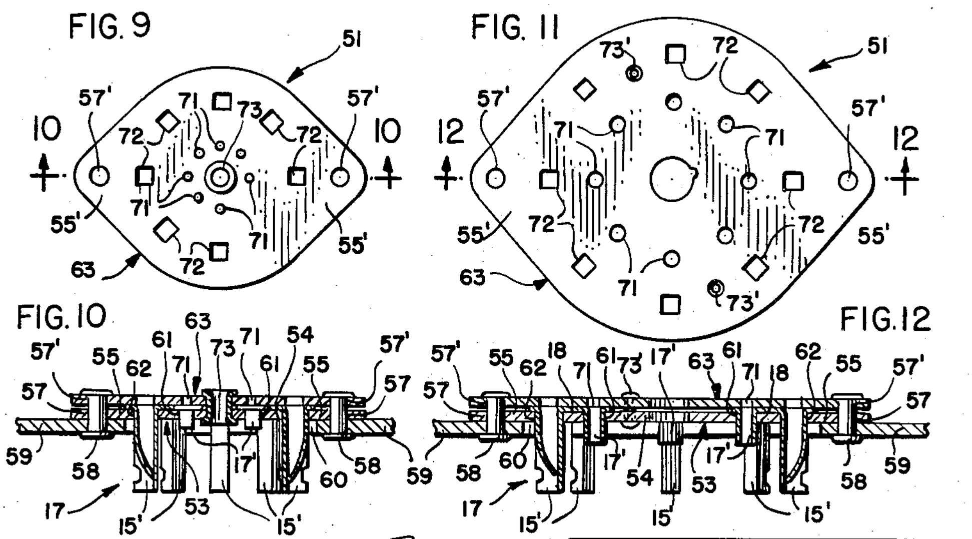

Figs. 9 and 11 are plan views of prong socket receptacles embodying combined soldering lugs and prong engaging contact elements embodying the present invention; and Figs. 10 and 12 are sectional views respectively taken substantially along the lines 10—10 in Fig. 9 and 12—12 in Fig. 11.

To illustrate the invention, the drawings show a wiring structure 11 comprising a panel 13 carrying a plurality of individual tubular or sleeve-like soldering lugs 15 mounted on and extending outwardly of one side of the panel, and a plurality of terminal members 17, each comprising a tubular or sleeve-like soldering lug element 15′ and a sleeve-like prong engaging socket element 17′ also mounted on the panel, with the elements 15′ and 17′ extending outwardly of the panel on the same side thereof as the lugs 15, whereby to present the panel remote ends of the lugs 15 and of the lug elements 15′ substantially in a common plane parallel with respect to and spaced from the panel. The panel connected ends of the soldering lugs 15 and of the soldering lug elements 15′, and of the contact elements 17′, are mounted in openings formed in the panel to receive the same, whereby said hollow sleeve-like members 15, 15′ and 17′ open upwardly of the panel. Cover plates 19 may be operatively associated with the terminal elements 17 to form socket receptacles 21 for pronged elements such as electron flow tube devices 23.

Electrical circuit elements such as resistors 25, condensers 27 or other circuit forming elements, including choke coils, reactors, bus bars and other conductors, and the like, may be electrically interconnected with each other and with electron flow devices 23 removably connected in the socket receptacles 21, in any desired or required circuit arrangement merely by applying the ends of the lead conductors 26 of the elements 25 and 27, and of the other elements to be interconnected, into selected soldering lugs 15 and lug elements 15′. After all required circuit connections have thus been made at the elements 15 and 15′, the entire panel 13 may be disposed in position to immerse the panel remote ends of the elements 15 and 15′ to a selected depth beneath the surface of a pool of molten solder, in order to form soldered joints 28 with the lead and other conductors assembled in the soldering lugs 15 and 15′, upon removal of the assembly from the pool of molten solder and the solidification of solder in the soldering lugs and around the conductors therein.

Figures 1, 2, 3, 4, 5:
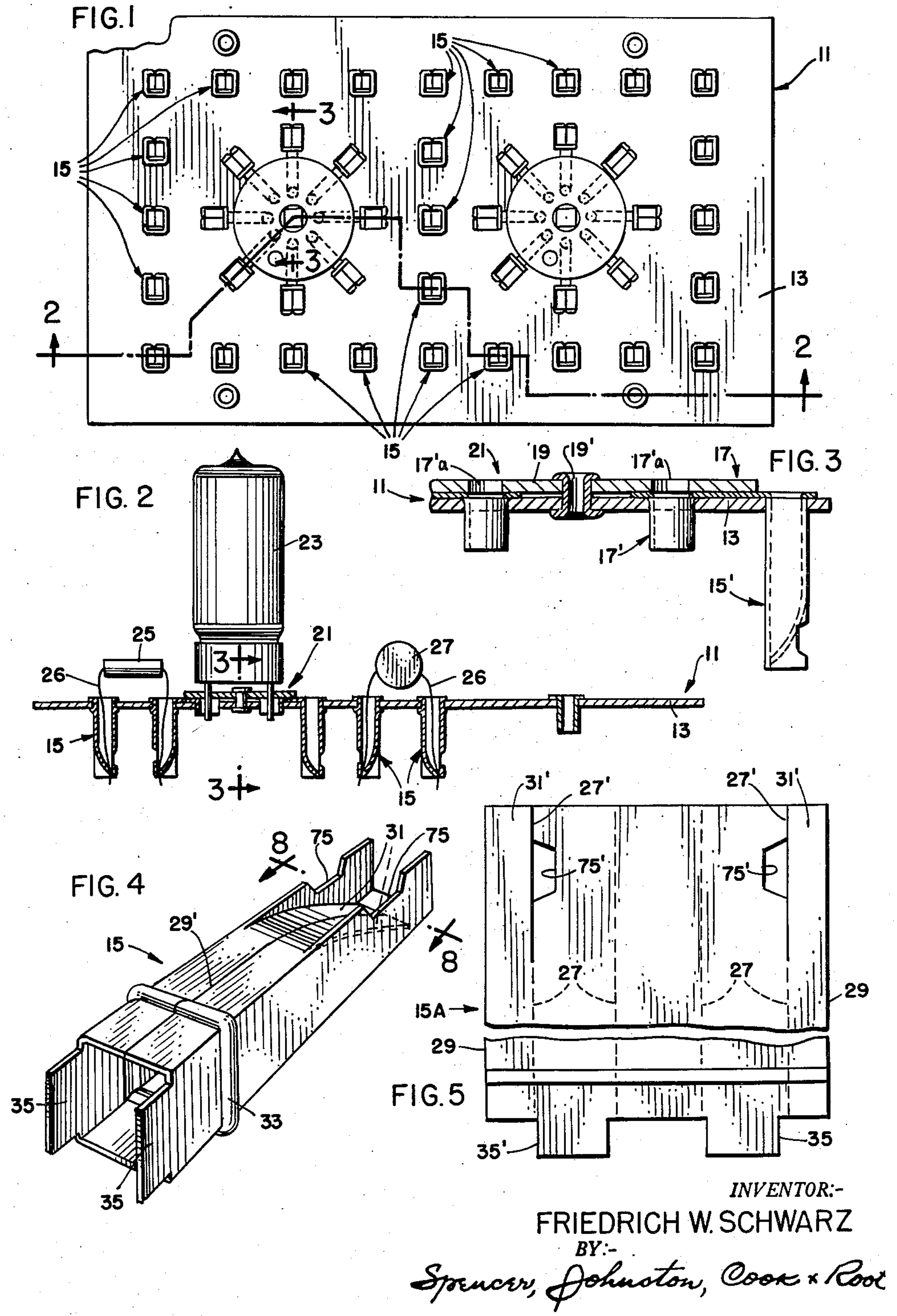
Fig. 4 is a perspective view of a soldering lug embodying the present invention.
Fig. 5 is a plan view of a sheet metal blank from which the lug shown in Fig. 4 may be fabricated.
Figures 6, 7, 8:
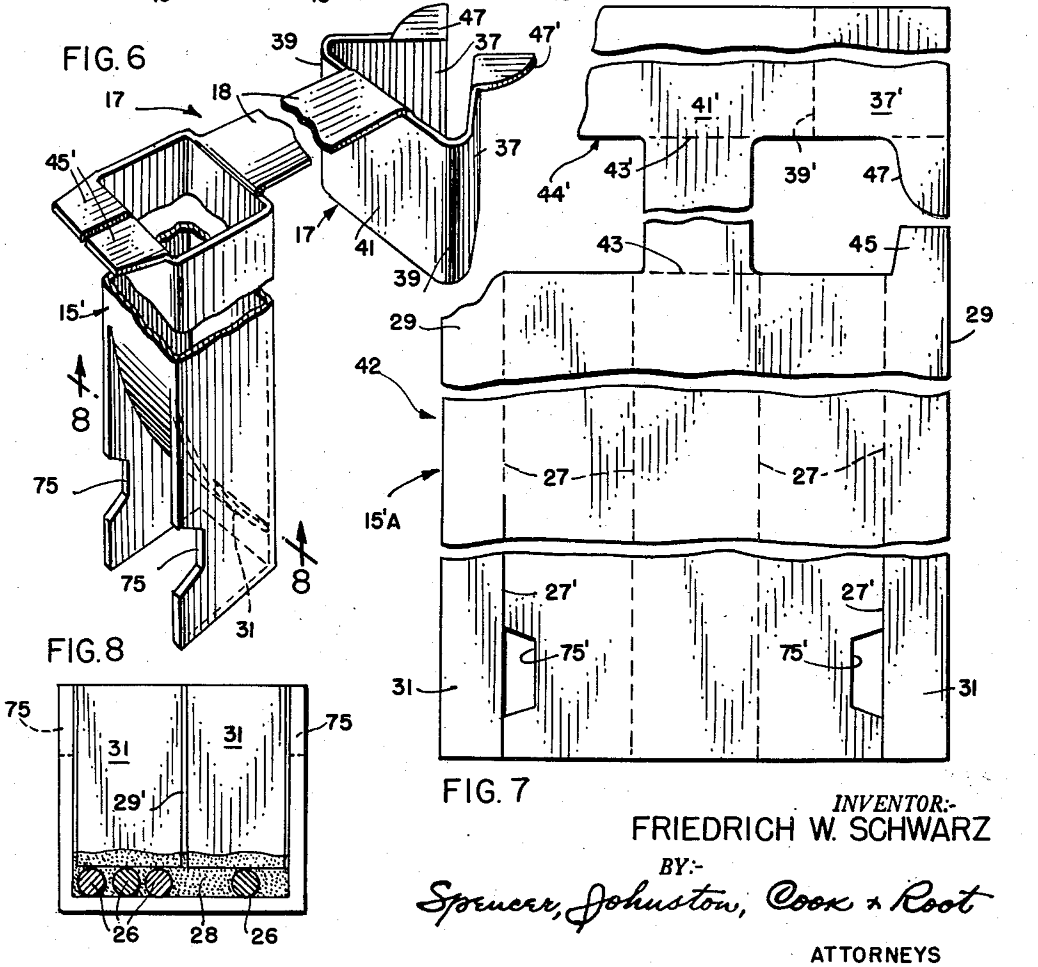
Fig. 6 is a perspective view showing a terminal element having mechanically and electrically interconnected soldering lug and prong contact portions embodying the present invention.
Fig. 7 is a plan view of a sheet metal blank from which the terminal element shown in Fig. 6 may be fabricated.
Fig. 8 is an enlarged sectional view taken substantially along the line 8—8 in Figs. 4 and 6.

The soldering lugs 15 and the terminal elements 17 preferably comprise formed sheet metal parts fabricated respectively from blanks 15A and 15′A of the sort in Figs. 5 and 7, the blanks having opposite side edges 29. The soldering lug elements 15 and 15′ preferably comprise hollow tubular structures formed by bending the blanks 15A and 15′A on longitudinal bend lines 27 to form the same each as a sleeve of preferably rectangular sectional configuration, wherein the opposite side edges 29 of the blank are disposed in abutting relationship to form a longitudinally extending seam 29′ extending preferably medially and longitudinally of a side wall of the tubular member. The blanks 15A and 15′A may be each formed with slits 27′ extending from one end of the blank substantially to its medial portion. The slits 27′ are preferably formed along a spaced apart pair of bend lines 27 defining the opposite side edges of a side wall of the sleeve-like member, in order to form resilient spring blade means mounted preferably on one side of the sleeve member in position to yieldingly press upon the opposite side thereof at one end of the lug. The slits 27′ are preferably formed along the opposite edges of that side of the tubular lug which contains the medial seam 29′, whereby said resilient spring means may comprise a pair of spring fingers 31 comprising portions 31′ of the blank disposed at and immediately inwardly of the opposite side edges 29 thereof.

The foregoing arrangement affords convenient means for providing a plurality of spring fingers 31, formed in the dip solder lug, on one side thereof, in position to yieldingly bear upon the opposite side wall of the lug, at one end thereof, whereby to yieldingly grip and hold conductors inserted into the lug from tthe opposite end thereof. The fingers 31 thus serve to secure conductors in the lug, at one end thereof, in position to be dip soldered thereto, upon immersion of said end of the lug in a pool of molten solder. The opposite end of the lug may be formed for attachment in an opening of the panel 13.

To this end, as shown more particularly in Fig. 4 of the drawings, the lug 15 may be provided with an outstanding peripheral rib 33 in position spaced from the end of the sleeve a distance equal to the thickness of the panel 13 on which the lug is to be mounted. Mounting extensions 35 may be formed on a pair of said extensions comprising tongues 35′ formed in the blank 15A in spaced relation on an end edge of the blank. The lug 15 accordingly may be inserted at its mounting end in the opening formed to receive the lug in the panel 13. The mounting end of the lug may thus be applied in the opening in position with the rib 33 in engagement with one side of the panel 13, at a lug mounting opening therein, whereupon the extensions 35 may be bent mutually outwardly and downwardly upon the other side of the panel, to thereby mount the tubular lug upon the panel by gripping the same by and between the outwardly bent extensions 35 and the rib 33. It will be seen that the mounted end of the lug 15 opens upwardly on the panel 13 so that conductors may be inserted into the soldering lug from above the panel.

As shown in Figs. 6 and 7, a tubular soldering lug element 15′ may be incorporated as a unitary part of a terminal member 17 which also embodies a prong receiving contact element 17′. While the elements 15′ and 17′, if desired, may be formed separately and then electrically and mechanically interconnected in spaced apart relationship by attaching a spacing member of electrical conducting material therebetween, it is preferable to form the terminal element from a blank configurated as shown in Fig. 7.

As shown, the prong receiving contact element 17′ comprises a pair of mutually inclined spring blades 37 secured in preferably integral fashion, as by means of preferably curved connection portions 39 at the opposite side edges of a support plate portion 41, said support plate portion 41, in turn, being mounted in spaced apart preferably parallel relation with respect to the facing side of the soldering lug element 15′. The plate portion 41, as shown, may be mechanically and electrically connected with said facing side of the lug element 15′ by means of a joining strip or lug 18. The blank 15′A accordingly may comprise a portion 42 substantially like the blank 15A and additional portions from which the contact element 17′ and the spacing piece 18 may be formed.

To these ends the blank 15′A may include an integral strip-like extension 18′ projecting preferably medially from the end edge of the lug forming portion 42 of the blank. The extension 18′ may be bent at right angles with respect to said lug forming portion of the blank, as along the bend line 43, to form the connection strip 18 in the terminal unit 17. The extension 18′ is also connected integrally with a sheet metal blank portion 44 which extends transversely outwardly of the opposite sides of the strip 18′. This portion 44 may comprise a medial section 41′ adapted to be bent at right angles with respect to the portion 18′, as along the bend line 43′, in order to form the portion 41 of the prong contact element. The portion 44 may also be curvingly bent as at 39′ at the opposite ends of the portion 41′ in order to constitute the opposite end portions 37′ of the blank portion 44 as the contact blades 37 of the prong contact element resiliently supported on and at the opposite ends of the portion 41.

The blank 15′A may also include extensions 45 and 47, respectively, on the lug and contact element forming portions 42 and 44 of the blank. These extensions may be formed at the opposite sides of the blank, in position to be bent therefrom to form outstanding tongues 45′ and 47′ on the element 17. The element 17 thus may be mounted on the panel 11 by applying the soldering lug element 15′ and the contact element 17′ into and through corresponding openings formed in the panel, the elements 15′ and 17′ being thus applied in said openings from the top face of the panel into position with the lugs 45′ and 47′ and the connection strap 18 in overlying engagement with the top face of the panel.

A plurality of terminal elements 17 may thus be mounted in the panel 13 with the contact elements 17′ thereof disposed in appropriate spaced apart relationship to receive the connection prongs or pins of an electron flow device, such as the tube 23, whereby to constitute such plurality of terminal elements 17 as a socket receptacle for the tube. To that end, the cover plate 19 may be applied upon the panel 13 and secured thereto, as by means of a rivet 19′, in position overlying the contact portions 17′, of the elements 17 forming said receptacle, the cover disc 19 being formed with prong receiving perforations 17′A in alinement with said contact portions 17′.

As shown more particularly in Figs. 9–12, a plurality of combined terminal lug and prong contact elements 17 may be employed in conjunction with a pair of discs in order to provide individual socket receptacles 51 for pronged elements such as electron flow tube devices. Each receptacle 51 may comprise a support disc or plate 53 having a central body portion 54 and oppositely extending mounting arms 55 which may be formed with perforations 57 for the accommodation of fastening means 58, such as rivets, whereby the plate may be anchored on a support base, such as panel 59, preferably formed with an opening 60 opposite the central portion 54 of the receptacle.

The plate 53 may be formed with prong openings 61 in spaced apart preferably circular arrangement, about the center of the plate 53, in position to receive the prongs of an element such as an electron flow tube. The plate 53 also may be formed, radially outwardly of the openings 61, with soldering lug openings 62. A combined terminal element 17 may be applied in each radially disposed pair of openings 61 and 62, with the terminal lug portion 15′ and the prong contact portion 17′ of the element extending respectively in the openings 61 and 62, the connection strap portion 18 of said element overlying upon the surface of the plate 53 between the said openings.

The receptacle unit 51 also comprises a cover plate 63 overlying upon at least the central portions 54 of the support plate 53, in position covering at least the upwardly facing ends of the prong engaging contact portions 17′ of the elements 17, the cover plate 63 being formed with prong receiving perforations 71 in vertical alinement with the openings 61 of the plate 53, whereby to guide the prongs of an element, mounted on the receptacle 51, into engagement with the prong engaging contact portions 17′ of the elements 17. If desired, the cover plate 63 may be sized to overlie also the upwardly facing ends of the soldering lug portions 15′ of the elements 17. In such case the plate 63 may be formed with openings 72 corresponding with the openings 62 of the plate 53 and in registration with such openings. Indeed, the plate 63 may have peripheral shape identical with that of the plate 53 and may include arms 55′ and openings 57′ disposed in position to register with the arm portions 55 and openings 57 of the plate 53.

Any suitable or preferred means may be employed for securing the plates 53 and 63 together in position to clampingly secure the upper ends of the soldering lug and prong engaging portions of the elements 17, and also the strap portions 18 of said elements, between the plates 53 and 63. As shown in Figs. 9 and 10, the fastening means may comprise a single rivet 73 applied at the center of the plates 53 and 63 to hold the same together. As shown in Figs. 11 and 12, spaced apart rivets 73′ may be employed securing the plates 53 and 63 together at anchoring stations outwardly of the center of the receptacle. Such fastening rivets, if desired, may comprise grommets applied in the alined openings 57 and 57′.

It will be noted that the sleeve elements 15 and 15′, substantially at the dip soldering end thereof, are provided with notches 75 which may conveniently be formed in the edges of the opposite sides of the sleeves between which the conductor holding blades 31 are disposed. In the event that it should become desirable to electrically interconnect otherwise disconnected sleeves 15 or 15′ in structures of the sort shown in Figs. 1, 9 and 11, such connection may be readily accomplished by applying the desired connecting conductor to the dip soldering ends of the sleeves to be joined, by winding the conductor upon such sleeves in position extending in the notches 75. Connection conductors may thus be applied prior to the dip soldering operation so that such conductors become electrically connected with the sleeves by means of soldered joints formed during and as a part of the dip solder operation. The blanks 15A and 15′A, of course, may be formed with cut out portions 75′ in order to provide the notches 75 in the formed dip soldering sleeve.

It is thought that the invention and its numerous attendant advantages will be fully understood from the foregoing description, and it is obvious that numerous changes may be made in the form, construction and arrangement of the several parts of the dip solder device without departing from the spirit or scope of the invention, or sacrificing any of its attendant advantages, the form herein disclosed being a preferred embodiment for the purpose of demonstrating the invention.

The invention is hereby claimed as follows:

An electrical connection device comprising sheet metal means bent to form a hollow open ended sleeve, a resilient spring finger formed on one side of said sleeve and having a depressible end in position normally engaging the opposite side of the sleeve, at one end thereof, for yieldingly holding a conductor element within the sleeve in position for dip soldering at said one end of the sleeve, a hollow prong receiving contact spaced from said sleeve and electrically connected therewith at the other end thereof by means of a flat joining strap, whereby said connection device may be mounted on a support panel with said sleeve and contact extending in spaced openings formed in the panel, with said joining strap in position overlying a face of the panel between said openings, and means to secure said connection device on the panel comprising a holding plate overlying at least a portion of said joining strap and secured on said panel to hold the connection device thereon in mounted position, said sleeve being notched adjacent the panel remote end thereof, in substantial registration with the depressible conductor engaging end of said finger, to form a seat in which an electrical conductor may be secured in position embracing the sleeve, whereby to facilitate the simultaneous dip soldering connection with said sleeve of a finger engaged conductor element as well as a seat mounted electrical conductor.

(References on following page)

References Cited in the file of this patent

UNITED STATES PATENTS

| | | |
|---|---|---|
| 1,387,252 | Fredricks | Aug. 9, 1921 |
| 1,963,794 | Kimbell | June 19, 1934 |
| 2,023,190 | Alden | Dec. 3, 1935 |
| 2,066,876 | Carpenter et al. | Jan. 5, 1937 |
| 2,503,559 | Miloche | Apr. 11, 1950 |
| 2,551,844 | Kueck | May 8, 1951 |
| 2,593,479 | Nieter | Apr. 22, 1952 |
| 2,723,384 | Lang | Nov. 8, 1955 |
| 2,745,081 | Offerman | May 8, 1956 |

FOREIGN PATENTS

| | | |
|---|---|---|
| 449,395 | Great Britain | June 22, 1936 |